United States Patent
Peschansky et al.

(10) Patent No.: US 9,688,315 B2
(45) Date of Patent: Jun. 27, 2017

(54) VEHICLE AND A CRADLE ASSEMBLY FOR THE VEHICLE

(71) Applicants: GM GLOBAL TECHNOLOGY OPERATIONS LLC, Detroit, MI (US); F.tech R&D North America, Inc., Troy, OH (US)

(72) Inventors: Len V. Peschansky, West Bloomfield, MI (US); Xiao Yu, Troy, OH (US); Balbir S. Sangha, Ajax (CA); Zohir Molhem, Rochester Hills, MI (US); Bikramjit Sarkaria, Windsor (CA); Joseph K. Moore, Whitby (CA)

(73) Assignees: GM Global Technology Operations LLC, Detroit, MI (US); F.tech R&D North America, Inc., Troy, OH (US)

( * ) Notice: Subject to any disclaimer, the term of this patent is extended or adjusted under 35 U.S.C. 154(b) by 11 days.

(21) Appl. No.: 14/750,256

(22) Filed: Jun. 25, 2015

(65) Prior Publication Data
US 2016/0375939 A1    Dec. 29, 2016

(51) Int. Cl.
*B62D 25/20*    (2006.01)
(52) U.S. Cl.
CPC ............................. *B62D 25/2009* (2013.01)

(58) Field of Classification Search
CPC .. B62D 25/2009; B62D 21/155; B62D 21/09; B62D 21/12
See application file for complete search history.

(56) References Cited

U.S. PATENT DOCUMENTS 6,029,765 A *    2/2000    Chou ................... B60K 5/1216
                                                                        180/292
2015/0021891 A1    1/2015    Sangha et al.

* cited by examiner

*Primary Examiner* — Glenn Dayoan
*Assistant Examiner* — Melissa A Black
(74) *Attorney, Agent, or Firm* — Quinn IP Law

(57) ABSTRACT

A vehicle includes an underbody and a cradle assembly. The assembly includes a cradle body and a flange extending to a distal end portion. The distal end portion includes a platform having at least one side and defining an aperture spaced from the side. A fastener is disposed through the aperture and in engagement with the underbody when the cradle body is in a first position. The platform defines a void and has a portion of material disposed adjacent to the void to present a release pathway. The cradle body is configured to move from the first position to a second position which separates the flange of the cradle body from the underbody by moving the fastener out of the aperture, through the void and the portion of material along the release pathway, and out the side of the platform when the cradle body moves to the second position.

20 Claims, 2 Drawing Sheets

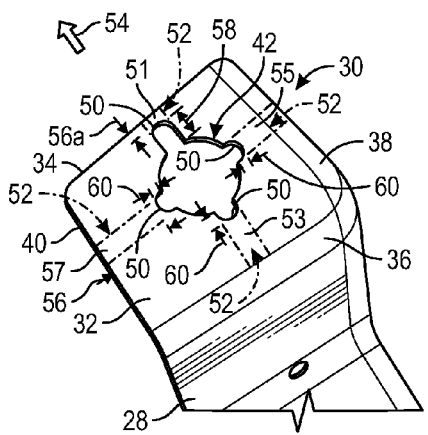
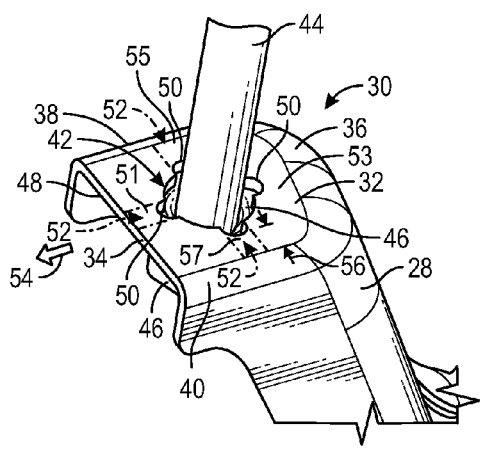
FIG. 4    FIG. 5
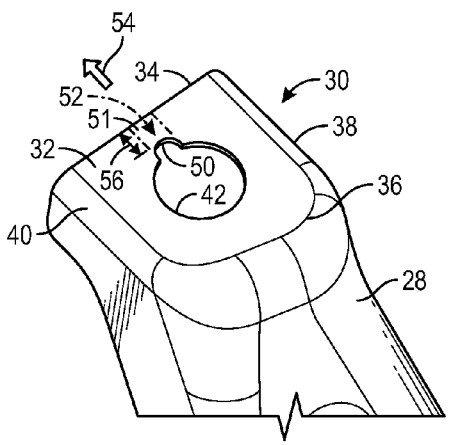
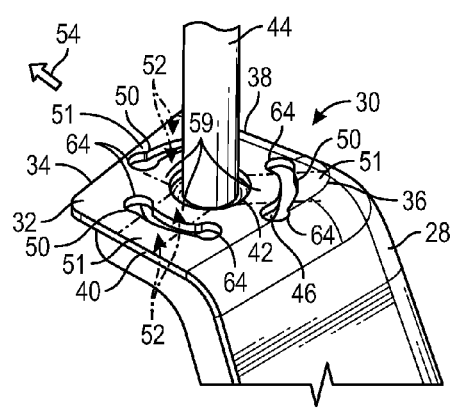
FIG. 6    FIG. 7
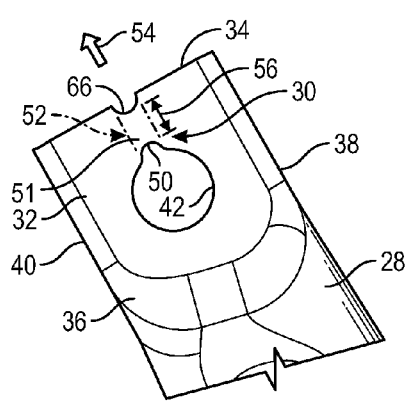
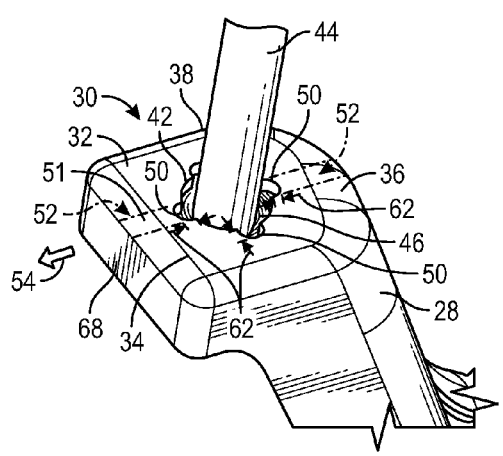
FIG. 8    FIG. 9

VEHICLE AND A CRADLE ASSEMBLY FOR THE VEHICLE

TECHNICAL FIELD

The present disclosure relates to a vehicle and a cradle assembly for the vehicle including an underbody.

BACKGROUND

Many vehicles include a cradle or sub-frame mounted to an underbody of the vehicle. The cradle is often located beneath a powertrain at a front end of the vehicle. The cradle serves to absorb energy, including vibrations and shocks, when a load is applied to the vehicle.

The cradle can be mounted to the underbody by a bolt. The bolt is surrounded by a sleeve and a box type joint of the cradle is welded to the sleeve. The bolt maintains the connection between the cradle and the underbody even when the load is applied to the vehicle. Therefore, the bolt does not shear and the cradle does not separate from the underbody with this design.

In other designs, the cradle can be mounted to the underbody by a bolt and the bolt shears to completely separate the cradle and the underbody.

In yet other designs, an intermediate bracket attaches the cradle to the underbody. The intermediate bracket has a groove that is open on one side of the bracket. A pin rests in the groove and there is no feature that overlaps the open side of the groove. When the load is applied to the vehicle, the pin moves out of the groove at the opening to separate the cradle from the underbody.

SUMMARY

The present disclosure provides a cradle assembly for a vehicle including an underbody. The cradle assembly includes a cradle body and the cradle body includes a flange extending outwardly away from the cradle body to a distal end portion. The distal end portion includes a platform having at least one side. The platform defines an aperture spaced from the side. The cradle assembly further includes a fastener disposed through the aperture and in engagement with the underbody for attaching the flange of the cradle body to the underbody when the cradle body is in a first position. The platform further defines a void proximal to the aperture, with the fastener spaced from the void when the cradle body is in the first position. The platform has a portion of material disposed adjacent to the void to present a release pathway. The cradle body is configured to move from the first position to a second position which separates the flange of the cradle body from the underbody by moving the fastener out of the aperture, through the void and the portion of material along the release pathway, and out the side of the platform when the cradle body moves to the second position.

The present disclosure also provides a vehicle including an underbody and a cradle assembly. The cradle assembly includes a cradle body attached to the underbody by a fastener when the cradle body is in a first position. The cradle assembly further includes a flange extending outwardly away from the cradle body to a distal end portion. The distal end portion includes a platform having at least one side. The platform defines an aperture spaced from the side, with the fastener disposed through the aperture and secured to the underbody when the cradle body is in the first position. The platform defines a void proximal to the aperture, with the fastener spaced from the void when the cradle body is in the first position. The platform has a portion of material disposed adjacent to the void to present a release pathway. The cradle body is configured to move from the first position to a second position which separates the flange of the cradle body from the underbody by moving the fastener out of the aperture through the void, through the portion of the material along the release pathway and out the side of the platform when the cradle body moves to the second position.

The detailed description and the drawings or Figures are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 4 is a schematic perspective view of a platform defining a plurality of voids adjoining an aperture, with one of the voids larger than the other voids.

FIG. 5 is a schematic perspective view of a platform defining a plurality of voids adjoining an aperture, with the voids being substantially the same.

FIG. 6 is a schematic perspective view of a platform defining a void adjoining an aperture.

FIG. 7 is a schematic perspective view of a platform defining a plurality of voids spaced from an aperture.

FIG. 8 is a schematic perspective view of a platform defining a void adjoining an aperture, and defining a recess spaced from the void and the aperture.

FIG. 9 is a schematic perspective view of an extension extending transverse from a first side of the platform.

DETAILED DESCRIPTION

Those having ordinary skill in the art will recognize that directional references such as "above", "below", "upward", "up", "downward", "down", "top", "bottom", "left", "right", "back", "forth", etc., are used descriptively for the figures to aid the reader's understanding of the present disclosure, and do not create limitations, particularly as to the position, orientation, use of the disclosure or scope as defined by the appended claims. Furthermore, the term "substantially" can refer to a slight imprecision or slight variance of a condition, quantity, value, or dimension, etc., some of which that are within manufacturing variance or tolerance ranges.

Figure 1:
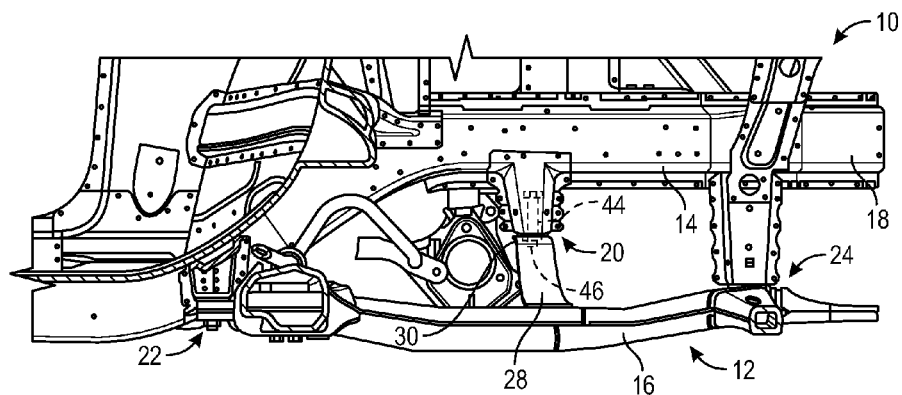
FIG. 1 is a schematic fragmentary cross-sectional view of an underbody and a cradle assembly in a first position.

Referring to the Figures, wherein like numerals indicate like or corresponding parts throughout the several views, a vehicle 10 and a cradle assembly 12 for the vehicle 10 are generally shown in FIG. 1.

As shown in FIG. 1, the vehicle 10 can include an underbody 14. The cradle assembly 12 is attached to the underbody 14. Specifically, the cradle assembly 12 includes a cradle body 16 that is attached to the underbody 14. The cradle body 16 can be located beneath a powertrain of the vehicle 10. Therefore, the powertrain can be located between the underbody 14 and the cradle body 16. The cradle body 16 can be attached to the underbody 14 at a front end 18 of the vehicle 10 or any other suitable location.

Figure 2:
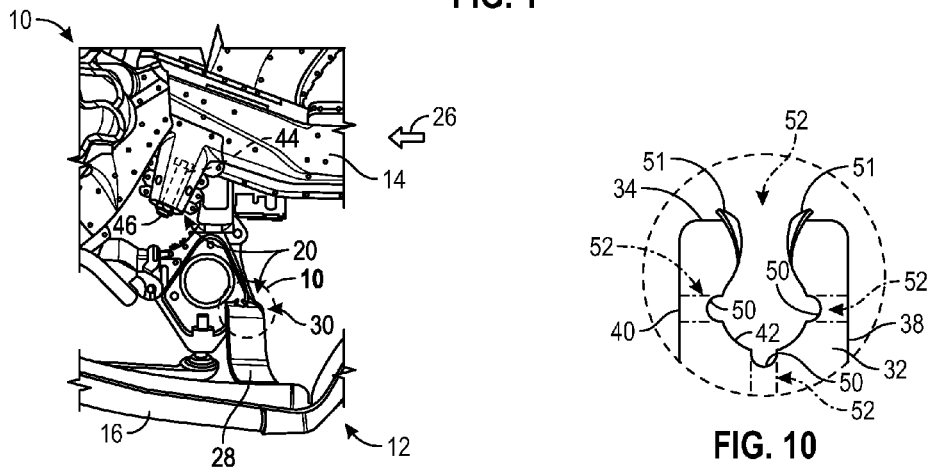
FIG. 2 is a schematic fragmentary cross-sectional view of the underbody and the cradle assembly in a second position.
Figure 3:
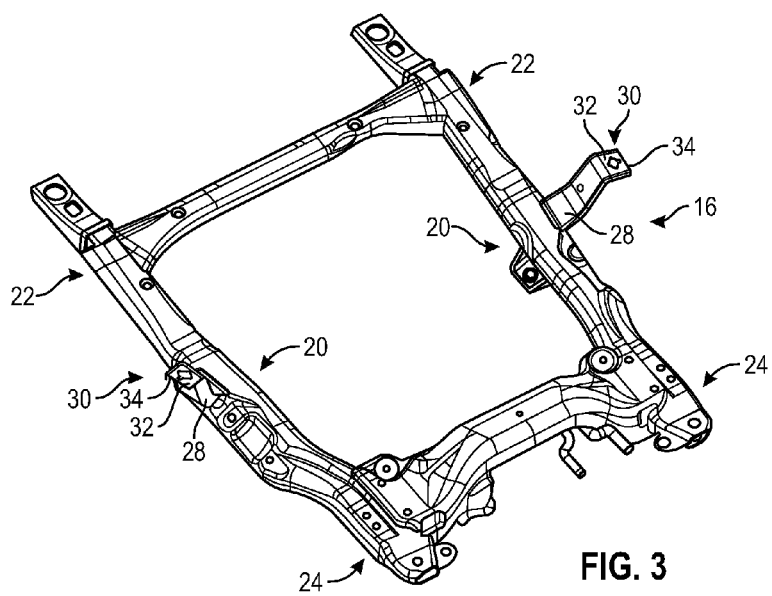
FIG. 3 is a schematic perspective view of a cradle body.

Referring to FIGS. 1-3, the cradle body 16 can be attached to the underbody 14 at a mid mount joint location 20 and at least one of a rear mount joint location 22 and a front mount joint location 24. The phrase "at least one of" as used herein should be construed to include the non-exclusive logical "or", i.e., at least one of the rear mount joint location 22 or the front mount joint location 24. Therefore, in certain embodiments, the cradle body 16 can be attached to the underbody 14 at the rear mount joint location 22 or the front mount joint location 24. In other embodiments, the cradle body 16 can be attached to the underbody 14 at the rear mount joint location 22 and the front mount joint location 24. For example, as shown in FIGS. 1 and 2, the cradle body 16 can be attached to the underbody 14 in the front mount joint location 24, the mid mount joint location 20 and the rear mount joint location 22. It is to be appreciated that the cradle body 16 can be attached to the underbody 14 at any other suitable location.

As shown in FIG. 2, the cradle body 16 can separate in one of the mount locations 20, 22, 24, and for illustrative purposes only, FIG. 2 illustrates separation at the mid mount joint location 20. Generally, the cradle body 16 can absorb energy, including vibrations and shocks, when a load 26 (identified as arrow 26 in FIG. 2) is applied to the vehicle 10. For example, the load 26 can be applied to the front end 18 of the vehicle 10. FIG. 1 illustrates the cradle body 16 before the load 26 has been applied and FIG. 2 illustrates when the load 26 is applied. Generally, when a threshold magnitude of the load 26 is reached, the cradle body 16 at least partially deforms.

Referring to FIGS. 1 and 3, the cradle assembly 12 includes a flange 28 extending outwardly away from the cradle body 16 to a distal end portion 30. In certain embodiments, this flange 28 extends outwardly at the mid mount joint location 20. Therefore, the flange 28 can attach the cradle body 16 and the underbody 14 together at the mid mount joint location 20. Alternatively, the flange 28 can attach the cradle body 16 and the underbody 14 together at other locations, such as for example, the rear mount joint location 22 and the front mount joint location 24, etc.

The distal end portion 30 includes a platform 32 (see FIGS. 4-9) having at least one side 34, 36, 38, 40. In certain embodiments, the at least one side 34, 36, 38, 40 is further defined as a plurality of sides 34, 36, 38, 40. Therefore, for example, the plurality of sides 34, 36, 38, 40 can include a first side 34 and a second side 36 opposing each other. Furthermore, in certain embodiments, the plurality of sides 34, 36, 38, 40 can include a third side 38 and a fourth side 40 opposing each other and disposed adjacent to the first and second sides 34, 36. The first side 34 of the platform 32 can face away from the cradle body 16. In other words, the first side 34 can generally face outwardly toward one of a drivers side or a passenger side of the vehicle 10. The platform 32 can have any suitable number of sides 34, 36, 38, 40, and the platform 32 can be any suitable configuration, and examples can include square, rectangular, circular, etc.

Generally, the cradle body 16 can be formed of a sheet metal. Therefore, the flange 28, and thus the platform 32, can be formed of the sheet metal. The sheet metal can be any suitable gage, and will be discussed further below.

Continuing with FIGS. 4-9, the platform 32 defines an aperture 42 spaced from the side 34, 36, 38, 40. When there are more than one side 34, 36, 38, 40, the aperture 42 is spaced from the sides 34, 36, 38, 40. Therefore, for example, the aperture 42 can be spaced from the first, second, third and fourth sides 34, 36, 38, 40. Furthermore, the aperture 42 can be disposed between the first, second, third and fourth sides 34, 36, 38, 40. The aperture 42 can be generally centered through the platform 32.

As shown in FIG. 1, the cradle body 16 is attached to the underbody 14 by a fastener 44 when the cradle body 16 is in a first position. Generally, the flange 28 attaches the cradle body 16 and the underbody 14 together at the mid mount joint location 20 when in the first position. Specifically, as shown in FIGS. 5, 7 and 9, the fastener 44 is disposed through the aperture 42 and, as shown in FIG. 1, in engagement with the underbody 14 for attaching the flange 28 of the cradle body 16 to the underbody 14 when the cradle body 16 is in the first position. As such, the fastener 44 is secured to the underbody 14 for attaching the flange 28 of the cradle body 16 to the underbody 14 when the cradle body 16 is in the first position. The first position of the cradle body 16 is shown in FIG. 1. Generally, the cradle body 16 is attached to the underbody 14 at the mid mount joint location 20 and at least one of the rear and front mount joint locations 22, 24 when in the first position.

The fastener 44 can be a bolt, a pin, etc. Furthermore, the fastener 44 can be threaded or unthreaded. The fastener 44 can be any suitable configuration to attach the cradle body 16 to the underbody 14 when the cradle body 16 is in the first position. Optionally, a sleeve can be disposed around the fastener 44.

Generally, the fastener 44 can include a head 46 (see FIGS. 5, 7 and 9) that is larger than the aperture 42 of the platform 32 to secure the flange 28 to the underbody 14. Additionally or alternatively, a washer can be disposed between the head 46 of the fastener 44 and a bottom side 48 (see FIG. 5) of the platform 32, with the washer being larger than the aperture 42 of the platform 32 to secure the flange 28 to the underbody 14.

Referring to FIGS. 4-9, the platform 32 defines a void 50 proximal to the aperture 42. For all of the embodiments, the fastener 44 is substantially spaced from the void 50 when the cradle body 16 is in the first position (see FIGS. 5, 7 and 9). All of the embodiments illustrated in the Figures have at least one void 50. For example, as shown in FIGS. 6 and 8, only one void 50 is adjoining the aperture 42 of the platform 32. The void 50 can extend in any suitable direction and be in any suitable location; as such, for example, the void 50 can be clocked. Furthermore, FIGS. 6 and 8 illustrate one example in which the void 50 can extend toward the first side 34 of the platform 32. Furthermore, the void 50 can be any suitable configuration or shape.

Continuing with FIGS. 4-9, the platform 32 has a portion of material 51 disposed adjacent to the void 50 to present a release pathway 52. The release pathway 52 provides a path of material that the fastener 44 can move through when the load 26 is applied to the vehicle 10. As such, the fastener 44 can move through the portion of material 51 along the release pathway 52 in certain situations which will be discussed further below. All of the embodiments illustrated in the Figures have at least one release pathway 52. For example, only one release pathway 52 is utilized for the platform 32 of FIGS. 6 and 8.

The cradle body 16 is configured to move from the first position (see FIG. 1) to a second position (see FIG. 2) which separates the flange 28 of the cradle body 16 from the underbody 14 by moving the fastener 44 out of the aperture 42 through the void 50, through the portion of material 51 along the release pathway 52 and out the side 34, 36, 38, 40 of the platform 32 when the cradle body 16 moves to the second position. Said differently, the cradle body 16 is configured to move from the first position to the second position which separates the flange 28 of the cradle body 16 from the underbody 14 by moving the fastener 44 out of the aperture 42, through the void 50 and the portion of material 51 along the release pathway 52, and out the side 34, 36, 38, 40 of the platform 32 when the cradle body 16 moves to the second position. Generally, the cradle body 16 moves to the second position when the threshold magnitude of the load 26 is applied to the vehicle 10. The manner in which the cradle body 16 and the underbody 14 separate reduces a deceleration pulse that occurs to a passenger compartment.

The load 26 applied to the vehicle 10 is transferred to the underbody 14 and the cradle body 16, and therefore, when the threshold magnitude of the load 26 is transferred thereto, the flange 28 will separate from the underbody 14. When the threshold magnitude of the load 26 is applied, the underbody 14 moves as well as the cradle body 16 moves from the first position to the second position. The underbody 14 and the cradle body 16 absorb energy as the cradle body 16 moves to the second position. The separation between the underbody 14 and the cradle body 16 can occur at the mid mount joint location 20 as shown in FIG. 2.

Figure 10:
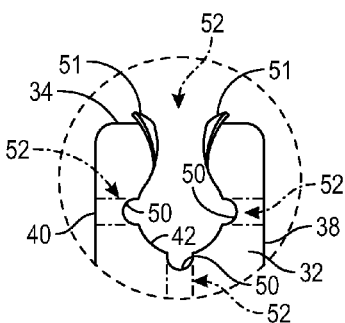
FIG. 10 is a schematic enlarged rotated top view of a flange taken from circled area 10 from FIG. 2.

Since the fastener 44 is secured to the underbody 14 and the fastener 44 is disposed through the aperture 42 of the platform 32, during the movement of the cradle body 16 to the second position, the fastener 44 tears through the release pathway 52 which, as shown in FIG. 10, deforms or shears the platform 32 to release the flange 28 from the underbody 14, and thus separates the flange 28 from the underbody 14, while the fastener 44 remains secured to the underbody 14 (see FIG. 2). Therefore, the fastener 44 does not shear as the fastener 44 tears through the release pathway 52 and remains secured to the underbody 14 when the cradle body 16 is in the first and second positions. For illustrative purposes only, an arrow 54 has been added in FIGS. 4-9 to illustrate one example of the general direction that the fastener 44 can tear through the platform 32. When the sleeve surrounds the fastener 44, the sleeve and the fastener 44 moves through the release pathway 52.

The void 50 decreases a width 56 of material adjacent thereto as compared to other locations of the platform 32, which causes the fastener 44 to tear through the platform 32 in a controlled location when the threshold magnitude of the load 26 is applied. Simply stated, the fastener 44 will move through the platform 32 in the path of least resistance. The void 50 can extend in any suitable direction and be in any suitable location, and FIGS. 6 and 8 illustrate one example in which the void 50 can extend toward the first side 34, and thus, the release pathway 52 is disposed between the first side 34 and the void 50 in FIGS. 6 and 8. More specifically, the void 50 can extend toward the first side 34 and away from the aperture 42.

In certain embodiments, the void 50 being proximal to the aperture 42 is further defined as the void 50 adjoins the aperture 42. Therefore, the void 50 can adjoin the aperture 42 such that the release pathway 52 is disposed between the side 34, 36, 38, 40 and the void 50. For example, FIGS. 4-6, 8 and 9 illustrate the void 50 adjoining the aperture 42. FIGS. 6 and 8 illustrate a single void 50 adjoining the aperture 42 which correspondingly illustrates a single release pathway 52.

As shown in FIGS. 4, 5 and 9, in various embodiments, the void 50 is further defined as a plurality of voids 50 spaced from each other, and the release pathway 52 is further defined as a plurality of release pathways 52. As such, adjacent to each of the voids 50 is correspondingly a release pathway 52. Therefore, the platform 32 has each of the release pathways 52 disposed between respective sides 34, 36, 38, 40 and respective voids 50. The fastener 44 moves through the respective portion of material 51, 53, 55, 57 along at least one of the respective release pathways 52 when the cradle body 16 moves to the second position. For example, the platform 32 has the portion of material 51 disposed between the first side 34 and one of the voids 50 to present one of the release pathways 52, a second portion of material 53 is disposed between the second side 36 and another one of the voids 50 to present another one of the release pathways 52, a third portion of material 55 is disposed between the third side 38 and yet another one of the voids 50 to present yet another one of the release pathways 52 and a fourth portion of material 57 is disposed between the fourth side 40 and yet another one of the voids 50 to present yet another one of the release pathways 52. As such, depending on the number of voids 50 being utilized, there can be a corresponding number of release pathways 52. For example, when utilizing four voids 50, there can be four release pathways 52. The fastener 44 moves through at least one of the release pathways 52 when the cradle body 16 moves to the second position. In certain embodiments, the fastener 44 can move through more than one of the release pathways 52 when the cradle body 16 moves to the second position. Which of the release pathways 52 that the fastener 44 tears through can depend on the general direction that the load 26 is applied to the vehicle 10. The voids 50 can extend in any suitable direction and be in any suitable location; as such, for example, one or more of the voids 50 can be clocked. Furthermore, the voids 50 can be any suitable configuration or shape. It is to be appreciated that the aperture 42 and the voids 50 can cooperate to define other configurations, and one other suitable configuration can be a star shape.

In certain embodiments, as best shown in FIG. 4, one of the voids 50 can extend a first distance 58 away from the aperture 42 toward one of the sides 34, 36, 38, 40 of the platform 32 and the remaining voids 50 can each extend a second distance 60 away from the aperture 42 toward respective other sides 34, 36, 38, 40. For example, one of the voids 50 can extend the first distance 58 away from the aperture 42 toward the first side 34 of the platform 32 and the remaining voids 50 can each extend the second distance 60 away from the aperture 42 toward respective second, third and fourth sides 36, 38, 40. The first distance 58 can be greater than the second distance 60. In other words, one of the voids 50 is larger than the other voids 50. Correspondingly, the release pathway 52 adjacent to the larger void 50 has a smaller width 56a than the width 56 of each of the other release pathways 52 that are adjacent to the other voids 50. The location of the larger void 50 can be in any suitable position relative to the other voids 50, and FIG. 4 is only illustrative of one example.

Alternatively, the larger void 50 of FIG. 4 can be configured as a through slot such that there is a section of no material from the aperture 42 through one of the sides 34, 36, 38, 40, i.e., the smaller width 56a equals zero, which changes the manner that the fastener 44 tears through the platform 32 along one of the release pathways 52 spaced from the through slot. When utilizing a plurality of voids 50, such as the embodiments of FIGS. 4 and 5 only, optionally, one of these voids 50 can be configured as the through slot as mentioned above. However, when utilizing a single void 50, such as the embodiments of FIGS. 6 and 8 only, the width 56 of material is always greater than zero.

In other embodiments, as shown in FIGS. 5 and 9, each of the voids 50 can extend a distance 62 away from the aperture 42. In this example, the distance 62 is substantially the same for each of the voids 50. In other words, each of the voids 50 can be substantially the same size. Correspondingly, the width 56 of each of the release pathways 52 adjacent to each of these voids 50 is substantially the same.

In certain embodiments, the void 50 being proximal to the aperture 42 is further defined as the void 50 being spaced from the aperture 42. As such, a piece of material is disposed between the void 50 and the aperture 42. When utilizing more than one void 50, as shown in FIG. 7, the voids 50 are spaced from the aperture 42 and radially spaced from each other. Therefore, the respective portion of material 51 is disposed between each of the voids 50 and respective sides 34, 36, 38, 40 and another respective portion of material 59 is disposed between the aperture 42 and respective voids 50. In this embodiment, there are release pathways 52 disposed along the respective portion of material 51 and the another respective portion of material 59. As such, there are at least two portions of materials 51, 59 of the platform 32 that the fastener 44 moves through when separating the flange 28 from the underbody 14. The fastener 44 moves through the portion of material 51 along at least one of the release pathways 52 and through the another portion of material 59 along at least another one of the release pathways 52 when the cradle body moves to the second position.

Each of the voids 50 can be elongated and each of the voids 50 can extend to ends 64 that have an arcuate configuration. In other words, the ends 64 of each of the voids 50 can be rounded or curved. The ends 64 have the arcuate configuration for stress relief purposes which minimizes fatigue of the platform 32. The elongated voids 50 can be any suitable configuration, such as substantially straight, curved or arcuate, etc. Furthermore, the elongated voids 50 can extend in any suitable direction and be in any suitable location.

The cradle assembly 12 can also include various optional features. For example, as shown in FIG. 8, the first side 34 of the platform 32 can define a recess 66 extending toward the void 50. Therefore, the release pathway 52 is disposed between the void 50 and the recess 66. The recess 66 can align with the void 50 in a spaced relationship such that the release pathway 52 is disposed therebetween. The recess 66 can be positioned in any suitable location and FIG. 8 is one example.

The threshold magnitude of the load 26 that causes the flange 28 to separate from the underbody 14 can be adjusted or tunable by various factors. For example, optionally, the side 34, 36, 38, 40 of the platform 32 can include an extension 68 (see FIG. 9) extending transverse to the platform 32. In one embodiment, the first side 34 of the platform 32 can include the extension 68. Optionally, any of the sides 34, 36, 38, 40 of the platform 32 can include the extension 68. The extension 68 adds strength and/or stiffness to the distal end portion 30, and thus changes the threshold magnitude of the load 26 that will cause the flange 28 to separate from the underbody 14. Therefore, for example, when the fastener 44 moves through the void 50 and the first side 34, the fastener 44 also moves through at least a portion of the extension 68 to separate the flange 28 from the underbody 14.

The threshold magnitude to cause the flange 28 to separate from the underbody 14 can also depend on other factors, such as, the type of material the cradle body 16 is formed of, the type of fastener 44 attaching the flange 28 to the underbody 14, the size of the void(s) 50, the size of the release pathways 52, the number of void(s) 50, the shape of the void(s) 50, the shape of the release pathways 52, the thickness of the material of the cradle body 16, i.e., the gage of the sheet metal, etc.

The flange 28 can be further defined as a plurality of flanges 28 each extending outwardly from the cradle body 16 to respective distal end portions 30. The flanges 28 can extend outwardly away from each other in generally opposite directions or extend in any other suitable direction. Furthermore, the flanges 28 can define the aperture 42 and the void(s) 50 as discussed above, and will not be repeated. FIG. 3 illustrates two flanges 28 defining respective apertures 42 and voids 50, and for illustrative purposes only, the flanges 28 are illustrated at the mid mount joint location 20, but as discussed above, the flanges 28 can be at other locations. Each of the flanges 28 can define the same void 50 configuration or define different void 50 configurations.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A cradle assembly for a vehicle including an underbody, the cradle assembly comprising:

a cradle body including a flange extending outwardly away from the cradle body to a distal end portion that includes a platform, with the platform having at least one side and defining an aperture spaced from the side;

a fastener disposed through the aperture and in engagement with the underbody for attaching the flange of the cradle body to the underbody when the cradle body is in a first position;

wherein the platform further defines a void proximal to the aperture, with the fastener substantially spaced from the void when the cradle body is in the first position, and the platform has a portion of material disposed adjacent to the void to present a release pathway; and wherein the cradle body is configured to move from the first position to a second position which separates the flange of the cradle body from the underbody by moving the fastener out of the aperture, through the void and the portion of material along the release pathway, and out the side of the platform when the cradle body moves to the second position;

wherein the void being proximal to the aperture is further defined as the void adjoining the aperture;

wherein the void is further defined as a plurality of voids spaced from each other and each adjoining the aperture, and the release pathway is further defined as a plurality of release pathways, and the at least one side is further defined as a plurality of sides, with the aperture spaced from the sides, and wherein the platform has each of the release pathways disposed between respective sides and respective voids, and wherein the fastener moves through the respective portion of material along at least one of the respective release pathways when the cradle body moves to the second position.

2. The assembly as set forth in claim 1 wherein at least one of the sides defines a recess extending toward one of the voids, with the release pathway disposed between the one of the voids and the recess.

3. The assembly as set forth in claim 1 wherein one of the voids extends a first distance away from the aperture toward one of the sides of the platform and the remaining voids each extend a second distance away from the aperture toward respective other sides, and wherein the first distance is greater than the second distance.

4. The assembly as set forth in claim 1 wherein each of the voids extend a distance away from the aperture, with the distance being substantially the same for each of the voids.

5. A cradle assembly for a vehicle including an underbody, the cradle assembly comprising:
   a cradle body including a flange extending outwardly away from the cradle body to a distal end portion that includes a platform, with the platform having at least one side and defining an aperture spaced from the side;
   a fastener disposed through the aperture and in engagement with the underbody for attaching the flange of the cradle body to the underbody when the cradle body is in a first position;
   wherein the platform further defines a void proximal to the aperture, with the fastener substantially spaced from the void when the cradle body is in the first position, and the platform has a portion of material disposed adjacent to the void to present a release pathway; and
   wherein the cradle body is configured to move from the first position to a second position which separates the flange of the cradle body from the underbody by moving the fastener out of the aperture, through the void and the portion of material along the release pathway, and out the side of the platform when the cradle body moves to the second position;
   wherein the at least one side is further defined as a plurality of sides, with the aperture spaced from the sides, and the void is further defined as a plurality of voids radially spaced from each other, and wherein the void being proximal to the aperture is further defined as the voids being spaced from the aperture such that the respective portion of material is disposed between each of the voids and respective sides, and another respective portion of material is disposed between the aperture and respective voids, and wherein the release pathway is further defined as a plurality of release pathways disposed along the respective portion of material and the another respective portion of material, and wherein the fastener moves through the portion of material along at least one of the release pathways and through the another portion of material along at least another one of the release pathways when the cradle body moves to the second position.

6. The assembly as set forth in claim 5 wherein each of the voids is elongated and each of the voids extend to ends that have an arcuate configuration.

7. The assembly as set forth in claim 1 wherein the sides are further defined as a first side and a second side opposing each other, with the aperture disposed between the first and second sides, and the first side of the platform faces away from the cradle body, and wherein one of the voids extends toward the first side.

8. The assembly as set forth in claim 7 wherein the first side defines a recess extending toward the one of the voids, with the release pathway disposed between the one of the voids and the recess.

9. The assembly as set forth in claim 1 wherein at least one of the sides of the platform includes an extension extending transverse to the platform.

10. A vehicle comprising:
    an underbody;
    a cradle assembly including:
        a cradle body attached to the underbody by a fastener when the cradle body is in a first position;
        a flange extending outwardly away from the cradle body to a distal end portion;
        wherein the distal end portion includes a platform having at least one side;
        wherein the platform defines an aperture spaced from the side, with the fastener disposed through the aperture and secured to the underbody when the cradle body is in the first position;
        wherein the platform defines a void proximal to the aperture, with the fastener substantially spaced from the void when the cradle body is in the first position;
        wherein the platform has a portion of material disposed adjacent to the void to present a release pathway; and
        wherein the cradle body is configured to move from the first position to a second position which separates the flange of the cradle body from the underbody by moving the fastener out of the aperture through the void, through the portion of material along the release pathway and out the side of the platform when the cradle body moves to the second position;
        wherein the void is further defined as a plurality of voids spaced from each other;
        wherein the release pathway is further defined as a plurality of release pathways;
        wherein the fastener moves through the respective portion of material along at least one of the respective release pathways when the cradle body moves to the second position.

11. The vehicle as set forth in claim 10 wherein the void being proximal to the aperture is further defined as the void adjoining the aperture such that the release pathway is disposed between the side and the void.

12. The vehicle as set forth in claim 11 wherein the voids each adjoin the aperture, and the at least one side is further defined as a plurality of sides, with the aperture spaced from the sides, and wherein the platform has each of the release pathways disposed between respective sides and respective voids.

13. The vehicle as set forth in claim 12 wherein one of the voids extends a first distance away from the aperture toward one of the sides of the platform and the remaining voids each extend a second distance away from the aperture toward respective other sides, and wherein the first distance is greater than the second distance.

14. The vehicle as set forth in claim 12 wherein each of the voids extend a distance away from the aperture, with the distance being substantially the same for each of the voids.

15. The vehicle as set forth in claim 10 wherein the at least one side is further defined as a plurality of sides, with the aperture spaced from the sides, and the voids are radially spaced from each other, and wherein the void being proximal to the aperture is further defined as the voids being spaced from the aperture such that the respective portion of material is disposed between each of the voids and respective sides, and another respective portion of material is disposed between the aperture and respective voids, and wherein the release pathways are disposed along the respective portion of material and the another respective portion of material, and wherein the fastener moves through the portion of material along at least one of the release pathways and through the another portion of material along at least another one of the release pathways when the cradle body moves to the second position.

16. The vehicle as set forth in claim 11 wherein the at least one side is further defined as a first side and a second side opposing each other, with the aperture disposed between the first and second sides, and the first side of the platform faces away from the cradle body, and wherein one of the voids extends toward the first side.

17. The vehicle as set forth in claim 16 wherein the first side defines a recess extending toward the one of the voids, with the release pathway disposed between the one of the voids and the recess.

18. The vehicle as set forth in claim 10 wherein at least one of the sides of the platform includes an extension extending transverse to the platform.

19. The vehicle as set forth in claim 10 wherein:
the cradle body is attached to the underbody at a mid mount joint location and at least one of a rear mount joint location and a front mount joint location when in the first position;
the flange attaches the cradle body and the underbody together at the mid mount joint location when in the first position; and
the cradle body separates from the underbody at the mid mount joint location when the cradle body moves to the second position.

20. The vehicle as set forth in claim 15 wherein each of the voids is elongated and each of the voids extend to ends that have an arcuate configuration.

\* \* \* \* \*